US006459054B1

(12) United States Patent
Rowe et al.

(10) Patent No.: US 6,459,054 B1
(45) Date of Patent: Oct. 1, 2002

(54) ADJUSTABLE SECONDARY CONTACT ASSEMBLIES FOR CIRCUIT BREAKERS

(75) Inventors: Neal Edward Rowe, Asheville; Ronnie Vance Witherspoon, Arden; Steven Louis Glover, Hendersonville, all of NC (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/578,670

(22) Filed: May 25, 2000

(51) Int. Cl.[7] .......................... H01H 9/00; H02B 11/00
(52) U.S. Cl. ................................................... 200/50.27
(58) Field of Search ............................ 200/50.01–50.4, 200/275, 237–261; 361/600–658

(56) References Cited

U.S. PATENT DOCUMENTS

| | | | | | |
|---|---|---|---|---|---|
| 2,917,592 | A | * | 12/1959 | Craig et al. | 200/50.27 |
| 3,197,583 | A | * | 7/1965 | Goodwin, Jr. et al. | 200/50.28 |
| 3,553,407 | A | * | 1/1971 | Hauser | 200/275 |
| 5,994,989 | A | | 11/1999 | Rowe et al. | |

* cited by examiner

*Primary Examiner*—J. R. Scott
(74) *Attorney, Agent, or Firm*—Martin J. Moran

(57) ABSTRACT

An adjustable circuit breaker portion of a multiple contact secondary contact assembly for mating with spaced, non-adjustable contact terminals of a circuit breaker enclosure, which includes a mounting rail and at least two contact modules. The contact modules a disposed on the mounting rail so that the contact modules align with the contact terminals.

20 Claims, 2 Drawing Sheets

ADJUSTABLE SECONDARY CONTACT ASSEMBLIES FOR CIRCUIT BREAKERS

BACKGROUND OF THE INVENTION

1. Field of the Invention

This invention relates to a secondary contact assembly which couples a circuit breaker and a circuit breaker enclosure, and, more specifically, to an adjustable circuit breaker portion of a secondary contact assembly that may be adjusted to couple a circuit breaker which is being retrofitted in a variety of circuit breaker enclosures.

2. Background Information

Power circuit breakers typically are mounted in a cabinet or enclosure. The enclosure includes a plurality of main contact busses or stabs which are coupled to the main quick disconnects of the circuit breaker. The enclosure further includes a secondary contact assembly which is coupled to the control mechanism of the circuit breaker, as well as other components described below. The control mechanism will trip the circuit breaker and separate the main contacts when an over current condition is sensed.

The secondary contact assembly includes two portions; a portion located on the circuit breaker enclosure and a corresponding portion on the circuit breaker. The secondary contact assembly may be located between the circuit breaker and a variety of components such as current transformers, voltage transformers, relays, switches in other circuit breakers, or sensor equipment. Circuit breakers typically have the circuit breaker portion of the secondary contact assembly on the outside of the circuit breaker. The circuit breaker portion of the secondary contact assembly is coupled to the control mechanism. The circuit breaker portion of the secondary contact assembly includes a plurality of spring biased, elongated members, or tabs. The enclosure portion of the secondary contact assembly also includes a plurality of finger like contact terminals. The finger like contact terminals are attached to a base member. Each contact terminal extends from the base and is flexible. Each contact terminal may be coupled to a variety of components such as current transformers, voltage transformers, relays, switches in other circuit breakers, or sensor equipment.

When the circuit breaker is inserted into the enclosure, each tab of the secondary contact assembly comes into contact with a contact terminal. Electricity passes from the circuit breaker to components such as current transformers, voltage transformers, relays, switches in other circuit breakers, or sensor equipment.

Different enclosures for different model circuit breakers have different shaped secondary contact assemblies. For example, the Federal Pacific “FP” vintage circuit breaker has a secondary contact assembly having four poles spaced on 1.25 inch center lines, while the “FPS” and General Electric AK series circuit breaker has a secondary contact assembly having seven poles spaced on 0.75 inch center lines. The Westinghouse DB series circuit breakers also have secondary contact assemblies with 1.25 centerlines. The ITE KA series circuit breaker has 0.875 inch centerlines for its secondary contact assemblies.

It is desirable to replace older circuit breakers with newer circuit breakers without having to replace the circuit breaker enclosure. One alternative would be to manufacture various models of the replacement circuit breaker, each having a secondary contact assembly which emulates a prior circuit breaker. This would, however, result in increased manufacturing costs and limit the usefulness of the replacement circuit breaker. It would be more efficient and convenient to have a single replacement breaker with an adjustable circuit breaker portion of the secondary contact assembly which could be assembled to match the enclosure portion of the secondary contact assembly.

There is, therefore, a need for an adjustable circuit breaker portion of a secondary contact assembly for a circuit breaker that may be adapted to be used with various circuit breaker enclosures.

There is a further need for an adjustable circuit breaker portion of a secondary contact assembly that may be assembled to match an enclosure at the insulation site.

There is a further need for an adjustable circuit breaker portion of a secondary contact assembly which may be assembled to match various enclosure using common components.

SUMMARY OF THE INVENTION

These needs and others are met by the invention which provides a secondary contact assembly made from individual contact units, spacers and a mounting rail.

The contact assembly is assembled by placing individual contact units on the mounting rail. The contact units may be maintained in a proper spaced relation by the spacers. When the contact units and spacers, if required, are assembled on the mounting rail in the proper order, each component is attached to the mounting rail. The contact units may be attached by any common method such as ultrasonic welding, glue, or a friction fit.

The contact units may be manufacturing to have a width of 0.625 inches. The spacers may have a thickness of 0.125 inches. Contact units and spacers having these dimensions can be assembled into secondary contact assemblies which may engage most prior art circuit breakers enclosures.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE PREFERRED EMBODIMENT

Figure 1:
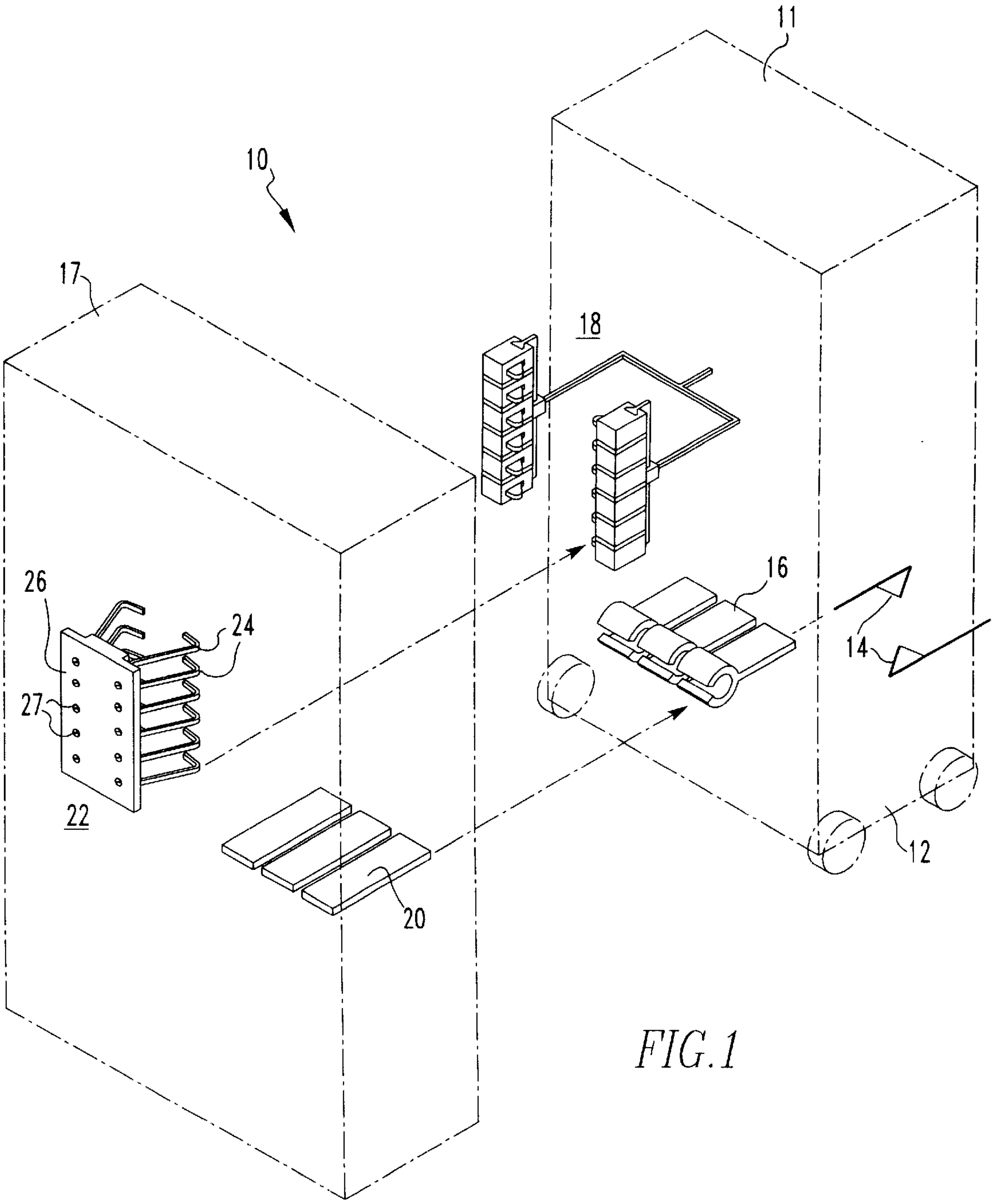
FIG. 1 is a schematic view of a circuit breaker and an enclosure each having a portion of the secondary contact assembly.

As shown in FIG. 1, a roll out circuit breaker installation 10 includes a rollout circuit breaker 11 and an enclosure 17. The circuit breaker 11 includes a housing 12, and at least one main contact quick disconnect 16 and a circuit breaker portion of a secondary contact assembly 18. At least one set of main contacts 14 is disposed within the housing and coupled to the main contact quick disconnect 16. The main contacts 14 may be opened and closed as is known in the art. The enclosure 17 includes at least one main contact stab 20 and an enclosure portion of a secondary contact assembly 22. The enclosure portion of the secondary contact assembly 22 includes a plurality of spaced finger like terminal members 24 attached at one end to a base 26. The free end of the terminal members 24 are flexible. Each terminal members 24 have a lead 27 which may be coupled to a variety of components such as current transformers, voltage transformers, relays, switches in other circuit breakers, or sensor equipment (not shown).

Different types of circuit breakers may have different types of secondary contact assemblies. Each of these configurations include a plurality of tab which may engage contact members in the secondary contact cavities mounted in a circuit breaker enclosure. Each of these secondary contact assembly configuration includes a different spacing between the tabs. The corresponding terminal members within the circuit breaker enclosure will be spaced to match the tabs.

Figure 2:
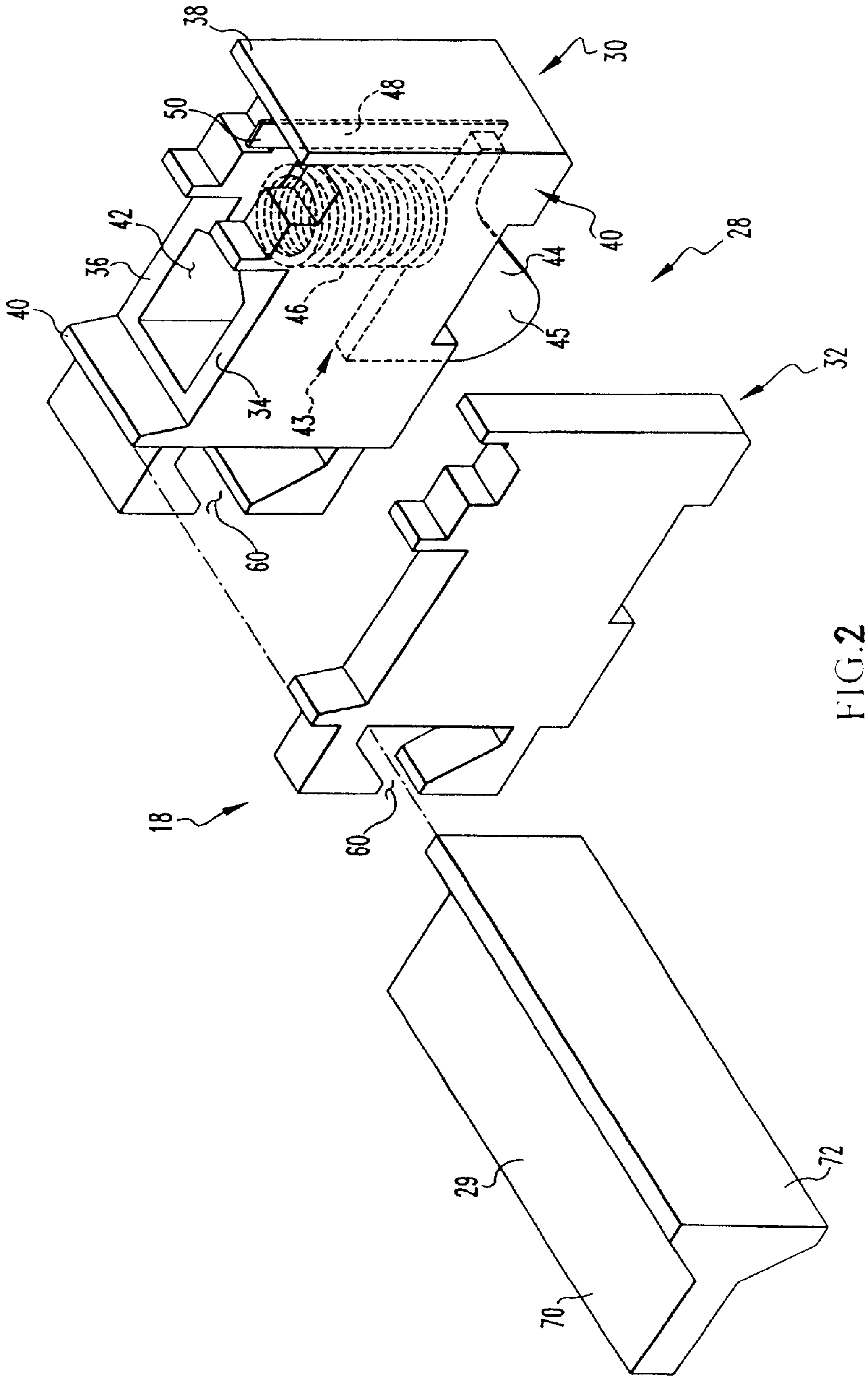
FIG. 2 is an exploded view of the circuit breaker portion of the secondary contact assembly according to the present invention.

As shown in FIG. 2, the circuit breaker portion of the secondary contact assembly 18 according to the present invention includes a mounting rail 29, a plurality of contact modules 28. The contact modules include at least one contact unit 30 and may include at least one spacer 32. The contact units 30 and the spacers 32 are preferably made from a dielectric material, such as plastic. Each contact unit 30 includes two opposing sidewalls 34, 36 which are held in spaced relation by a first end wall 38 and a second end wall 40, thereby forming a contact cavity 42. Within the contact cavity 42 is a conductor assembly 43. The conductor assembly 43 includes a contact member 44, a biasing means such as a spring 46, and a conductive member 48. The contact member 44 is pivotally mounted within contact cavity 42 and has an tab 45, which extends out of contact cavity 42. Spring 46 biases tab 45 out of cavity 42. Contact member 44 is in electrical communication with conductive member 48. Conductive member 48 includes a terminal 50 which extends past, or through, sidewalls 34, 36 and ends 38, 40.

When assembled (as described below) and mounted on circuit breaker 11, the contact modules 28 will be spaced to align with the terminal members 24 of the enclosure portion of the secondary contact assembly 22. When circuit breaker 11 is inserted in enclosure 17, each tab 45 contacts a terminal member 24.

As noted above, terminal members 24 on the enclosure portion of the secondary contact assembly 22 of different enclosures 14 may have different spacing. In order to accommodate the various configurations of terminal members 24, the circuit breaker portion of the secondary contact assembly 18 may be configured using various combinations of contact modules 28. The contact units 30 preferably have a width of about 0.625 inches. The spacers preferably have a width of about 0.125 inches. Contact modules which include contact units 30 and spacers 32 with these dimensions may be assembled to match the secondary contact assemblies 22 of many prior art enclosures 17. Both the contact units 30 and the spacers 32 have a dovetail cutout 60. Mounting rail 29 includes base 70 and an male dovetail connector 72. The connector 72 is sized to fit snuggly within cutout 60.

In operation, an older model circuit breaker may be replaced with a new circuit breaker 11. The circuit breaker portion of the secondary contact assembly 18 can be constructed by placing contact modules 28 on mounting rail 29 in an appropriate order so that the contact units 30 are aligned with contact terminals 24 in the enclosure portion of the secondary contact assembly 22. Thus, when the circuit breaker 11 is inserted into enclosure 17, the circuit breaker portion of the secondary contact assembly 18 and the enclosure portion of the secondary contact assembly 22 will align with each other allowing electricity to flow therethrough. The contact modules 28 may be fixed to the mounting rail 29 by any common means such as, but not limited to, ultrasonic welding, glue, having a friction fit between the dovetail connector 72 and the dovetail cutout 60, or having caps placed at either end of the mounting rail 29.

When assembled the circuit breaker portion of the secondary contact assembly 18 may be structured to engage specific prior art circuit breaker enclosures 17. For example, as show in FIG. 1, the contact terminals 24 are formed in two rows of seven contact terminals 24 extending from a central base in opposite directions. The configuration represents a FPS series circuit breaker. The centerlines for the terminal contacts 24 are spaced 0.75 inch apart. Thus, to assembly a circuit breaker portion of the secondary contact assembly 18 to match the FPS series circuit breaker, one would construct six modules 28 having one contact unit 30 and one spacer 32. The final module 28 would not require a spacer 32.

While specific embodiments of the invention have been described in detail, it will be appreciated by those skilled in the art that various modifications and alternatives to those details could be developed in light of the overall teachings of the disclosure. For example, while the spacers 32 are a convenient device for maintaining the proper spacing between contact units 30, the spacers 32 are not required. Modules 28 could be disposed in an appropriate position on mounting rail 29 with spaces between the modules 28 and the modules 28 fixed in place. Accordingly, the particular arrangements disclosed are meant to be illustrative only and not limiting as to the scope of invention which is to be given the full breadth of the claims appended and any and all equivalents thereof.

What is claimed is:

1. An adjustable circuit breaker portion of a multiple contact secondary contact assembly for mating with spaced, non-adjustable contact terminals of a circuit breaker enclosure, said secondary contact assembly comprising:

a mounting rail;

at least two contact modules;

said contact modules disposed on said mounting rail;

wherein said contact modules include at least two contact units and an intermediate spacer for maintaining said contact units in a spaced relation on said mounting rail.

2. The secondary contact assembly of claim 1, wherein:

said mounting rail includes a male dove tail connector;

said at least two contact units and said at least one spacer include female dove tail connectors.

3. The secondary contact assembly of claim 2, wherein said at least two contact units and said at least one spacer are ultrasonically welded to said mounting rail.

4. The secondary contact assembly of claim 3, wherein said contact units have centerlines spaced 0.75 inch apart.

5. The secondary contact assembly of claim 3, wherein said contact units have centerlines spaced 1.25 inches apart.

6. The secondary contact assembly of claim 1, wherein said at least two contact units and said at least one spacer are made of a dielectric material.

7. The secondary contact assembly of claim 1, wherein:

each said contact unit includes two opposing sidewalls held in spaced relation by a first and second end wall forming a cavity, and a conductor assembly;

said conductor assembly disposed in said contact unit cavity and having a contact member and a biasing means; and said biasing means biasing a portion of said contact member out of said contact unit cavity.

8. The secondary contact assembly of claim 7, wherein said contact member aligns with said contact terminals.

9. The secondary contact assembly of claim 1, wherein:

each said contact units has a width of 0.625 inches; and said spacer has a width of 0.125 inches.

10. A circuit breaker installation comprising:

an enclosure having at least one main contact stab and an enclosure portion of a secondary contact assembly;

a circuit breaker comprising:

a housing;

a set of main contacts disposed within said housing;

at least one main contact quick disconnect;

said main contact quick disconnect structured to engage said main contact stab;

a circuit breaker portion of a secondary contact assembly comprising:

a mounting rail;

at least two contact modules;

said contact modules disposed on said mounting rail; and wherein said contact modules include at least two contact units; and an intermediate spacer for maintaining said contact units in spaced relation on said mounting rail.

11. The secondary contact assembly of claim 10, wherein:

said mounting rail includes a male dove tail connector;

said at least two contact units and said at least one spacer include female dove tail connectors.

12. The secondary contact assembly of claim 11, wherein said at least two contact units and said at least one spacer are ultrasonically welded to said mounting rail.

13. The secondary contact assembly of claim 12, wherein said contact units have centerlines spaced 0.75 inch apart.

14. The secondary contact assembly of claim 12, wherein said contact units have centerlines spaced 1.25 inches apart.

15. The secondary contact assembly of claim 10, wherein said at least two contact units and said at least one spacer are made of a dielectric material.

16. The secondary contact assembly of claim 10, wherein:

each said contact unit includes two opposing sidewalls held in spaced relation by a first and second end wall forming a cavity, and a conductor assembly;

said conductor assembly disposed in said contact unit cavity and having a contact member and a biasing means; and said biasing means biasing a portion of said contact member out of said contact unit cavity.

17. The secondary contact assembly of claim 16, wherein said contact member aligns with said contact terminals.

18. The secondary contact assembly of claim 10, wherein:

each said contact units has a width of 0.625 inches; and said spacer has a width of 0.125 inches.

19. An adjustable circuit breaker portion of a multiple contact secondary contact assembly for mating with spaced, non-adjustable contact terminals of a circuit breaker enclosure, said secondary contact assembly comprising:

a mounting rail;

a contact module;

said contact module disposed on said mounting rail;

wherein said contact module includes at least two contact units; and an intermediate relation on said mounting rail.

20. A circuit breaker installation comprising:

an enclosure having at least one main contact stab and an enclosure portion of a secondary contact assembly;

a circuit breaker comprising:

a housing;

a set of main contacts disposed within said housing;

at least one main contact quick disconnect;

said main contact quick disconnect structured to engage said main contact stab;

a circuit breaker portion of a secondary contact assembly comprising:

a mounting rail;

a contact module;

said contact module disposed on said mounting rail; and wherein said contact module includes at least two contact units; and an intermediate space for maintaining said contact units in spaced relation on said mounting rail.

* * * * *